(12) United States Patent
Shimizu

(10) Patent No.: US 9,263,866 B2
(45) Date of Patent: Feb. 16, 2016

(54) CORRUGATED TUBE AND WIRE HARNESS WITH CORRUGATED TUBE

(71) Applicant: SUMITOMO WIRING SYSTEMS, LTD., Mie (JP)

(72) Inventor: Masataka Shimizu, Mie (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 0 days.

(21) Appl. No.: 14/431,443

(22) PCT Filed: Aug. 6, 2013

(86) PCT No.: PCT/JP2013/071189
§ 371 (c)(1),
(2) Date: Mar. 26, 2015

(87) PCT Pub. No.: WO2014/054337
PCT Pub. Date: Apr. 10, 2014

(65) Prior Publication Data
US 2015/0270691 A1    Sep. 24, 2015

(30) Foreign Application Priority Data
Oct. 5, 2012   (JP) .................................. 2012-222999

(51) Int. Cl.
*H02G 3/04* (2006.01)
*B60R 16/02* (2006.01)
(Continued)

(52) U.S. Cl.
CPC .......... *H02G 3/0406* (2013.01); *B60R 16/0215* (2013.01); *F16L 9/22* (2013.01); *H01B 7/0045* (2013.01); *H02G 3/04* (2013.01); *H02G 3/0468* (2013.01)

(58) Field of Classification Search
CPC ..... H02G 3/04; H02G 3/0406; H02G 3/0462; H02G 3/0468; H02G 3/06; B60E 16/0215; B60E 16/0207; H01B 7/0045; F16L 5/00; F16L 9/22; F16L 7/00; F16L 9/06; F16L 11/00

USPC ...... 174/72 A, 68.1, 68.3, 72 C, 36, 92, 72 R, 174/88 R, 70 C; 138/121, 118, 156, 128, 138/169, 162, 166, 167, 168, 109; 248/73, 248/74.2, 74.1, 205.2, 205.3, 205.6, 49, 248/68.1

See application file for complete search history.

(56) References Cited

U.S. PATENT DOCUMENTS 6,034,329 A * 3/2000 Kawamura .......... B60R 16/0215
174/68.3
6,078,009 A * 6/2000 Kawamura ........... H02G 3/0468
174/68.3

(Continued)

FOREIGN PATENT DOCUMENTS

JP   60-158055    8/1985
JP   63-182395    11/1988

(Continued)

OTHER PUBLICATIONS

Search report from PCT/JP2013/071189, mail date is Sep. 24, 2013.

*Primary Examiner* — Angel R Estrada
(74) *Attorney, Agent, or Firm* — Greenblum & Bernstein, P.L.C.

(57) ABSTRACT

A corrugated tube includes a corrugated tube main body, a plurality of first extended tabs, and a plurality of second extended tabs. The corrugated tube main body is formed in a tubular shape, has annular projections and annular depressions alternatingly formed along a length direction, and has a slit formed along the length direction. The plurality of first extended tabs is provided at intervals on the corrugated tube main body on one of two lateral edges having the slit therebetween. A first engagement notch is formed on two lateral portions of each of the first extended tabs. The plurality of second extended tabs is provided at intervals on the corrugated tube main body on the other of the two lateral edges having the slit therebetween. A second engagement notch is formed on two lateral portions of each of the second extended tabs and engages with the first engagement notch.

5 Claims, 17 Drawing Sheets

(51) Int. Cl.
*F16L 9/22* (2006.01)
*H01B 7/00* (2006.01)

(56) References Cited

U.S. PATENT DOCUMENTS

| | | | | |
|---|---|---|---|---|
| 6,488,053 | B1 * | 12/2002 | Tadokoro | H02G 3/0468 138/121 |
| 6,843,276 | B2 * | 1/2005 | Tadokoro | H02G 3/0468 174/72 C |
| 7,045,709 | B2 * | 5/2006 | Koike | H02G 3/0468 174/68.3 |
| 7,435,899 | B2 * | 10/2008 | Okada | H02G 3/0468 174/36 |
| 7,614,427 | B2 * | 11/2009 | McKane | H02G 3/0475 138/121 |

FOREIGN PATENT DOCUMENTS

| | | |
|---|---|---|
| JP | 2000-224727 | 8/2000 |
| JP | 2009-038964 | 2/2009 |

* cited by examiner

CORRUGATED TUBE AND WIRE HARNESS WITH CORRUGATED TUBE

FIELD OF THE INVENTION

The present invention relates to a corrugated tube protecting electric wires.

BACKGROUND OF THE INVENTION

A corrugated tube may be used as a sheath to protect electric wires. A slit is formed in the corrugated tube and the electric wires are placed within the corrugated tube through the slit. In addition, after the electric wires are placed in the corrugated tube, adhesive tape is wound around the corrugated tube, thereby inhibiting the corrugated tube from opening.

However, when a long period of time passes, adhesion of the adhesive tape may deteriorate. Alternatively, a substrate of the adhesive tape may deteriorate and the adhesive tape may break. Therefore, the corrugated tube may open at the slit.

In this regard, a corrugated tube having a lock structure is suggested, as in Patent Literature 1.

In a corrugate disclosed by Patent Literature 1, a lock projection is formed on one of two edges having a slit therebetween. Then, when the slit is closed, the lock projection engages with a closing wall on the other of the two edges and the slit is locked in a sealed state.

RELATED ART

Patent Literature

Patent Literature 1: Japanese Patent Laid-open Publication No. 2009-38964

SUMMARY OF THE INVENTION

Problems to Be Solved by the Invention

However, in the technology disclosed by Patent Literature 1, the lock projection engages with the closing wall from an inner periphery of the closing wall. Therefore, the two edges having the slit therebetween may displace in a diameter direction of the corrugated tube. Accordingly, one of the edges having the slit therebetween may encroach toward the inner periphery of the other of the edges, for example. Alternatively, engagement of the lock projection may be released and the corrugated tube may open.

The present invention seeks to enable a closed state of a slit to be more reliably maintained.

Means for Solving the Problems

In order to resolve the circumstances noted above, a first aspect includes a corrugated tube main body formed in a tubular shape, with annular projections and annular depressions alternatingly formed along a length direction thereof, and with a slit formed along the length direction thereof; a plurality of first extended tabs provided at intervals on the corrugated tube main body on one of two lateral edges having the slit therebetween, the first extended tabs having a first engagement notch formed on two lateral portions; and a plurality of second extended tabs provided at intervals on the other of the two lateral edges at positions between each of the first extended tabs, the second extended tabs having a second engagement notch formed on two lateral portions and capable of engaging with the first engagement notch.

A second aspect is the corrugated tube according to the first aspect, in which at least one guiding lateral portion is formed on at least one of the plurality of first extended tabs and the plurality of second extended tabs, the guiding lateral portion advancing inward toward a forefront end of the first extended tabs and the second extended tabs.

A third aspect is the corrugated tube according to one of the first and second aspect, in which a depression is formed on a portion of an inner periphery of the corrugated tube main body, the plurality of first extended tabs or the plurality of second extended tabs being positioned in the depression in a state where the plurality of first extended tabs and the plurality of second extended tabs are fitted together.

A fourth aspect is the corrugated tube according to any one of the first to third aspects, in which the plurality of first extended tabs are recessed toward the inner periphery of the corrugated tube main body via a step portion at positions where the first engagement notches are provided, and the plurality of second extended tabs are recessed toward the inner periphery of the corrugated tube main body via a step portion at positions where the second engagement notches are provided.

A fifth aspect is the corrugated tube according to any one of the first to fourth aspects, in which a dimension between troughs of two mutually opposing first engagement notches or second engagement notches is larger than a maximum width dimension of the second extended tab or the first extended tab fitted therebetween.

A wire harness with a corrugated tube according to a sixth aspect includes a wire harness having at least one electric wire; and a corrugated tube according to any one of the first to fifth aspects, in which the corrugated tube covers the wire harness in a state where the plurality of first extended tabs and the plurality of second extended tabs are fitted together.

Effect of the Invention

According to the first or sixth aspects, the plurality of first extended tabs and the plurality of second extended tabs are fitted together so as to be inserted into respective gaps therebetween, thereby engaging each first engagement notch of the plurality of first extended tabs with each second engagement notch of the plurality of second extended tabs. Thus, a closed state of the slit can be more reliably maintained.

According to the second aspect, at least one guiding lateral portion is formed on at least one of the plurality of first extended tabs and the plurality of second extended tabs, the guiding lateral portion advancing inward toward the forefront end of the first extended tabs and the second extended tabs. Therefore, at least one of the plurality of first extended tabs and the plurality of second extended tabs is readily inserted between the other of the plurality of first extended tabs and the plurality of second extended tabs.

According to the third aspect, protrusion of the first extended tab and the second extended tab toward the inner periphery of the corrugated tube can be controlled.

According to the fourth aspect, the first engagement notch of the plurality of first extended tabs and the second engagement notch of the plurality of second extended tabs mutually engage with each other at the position of the step portions. Therefore, the first engagement notch and the second engagement notch can be more reliably engaged and opening of the slit can be more reliably controlled.

According to the fifth aspect, the dimension between troughs of two mutually opposing first engagement notches or second engagement notches is larger than the maximum width dimension of the second extended tab or the first extended tab respectively fitted therebetween. Therefore, at least one of the plurality of first extended tabs and the plurality of second extended tabs can be readily inserted between two mutually opposing first engagement notches or second engagement notches.

MODE FOR CARRYING OUT THE INVENTION

Figure 1:
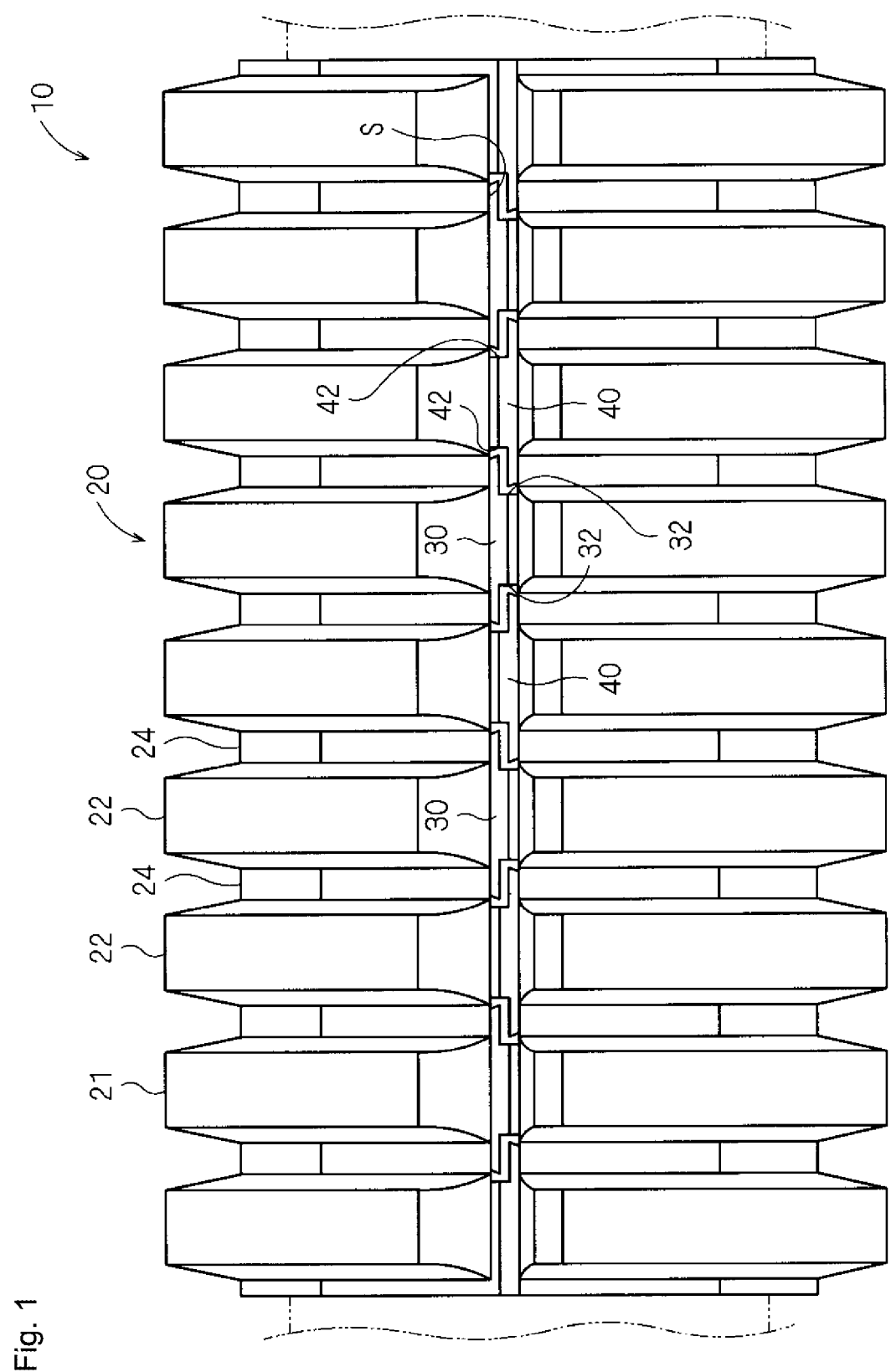
FIG. 1 is a partial plan view of a wire harness to which a corrugated tube according to an embodiment is attached.
Figure 2:
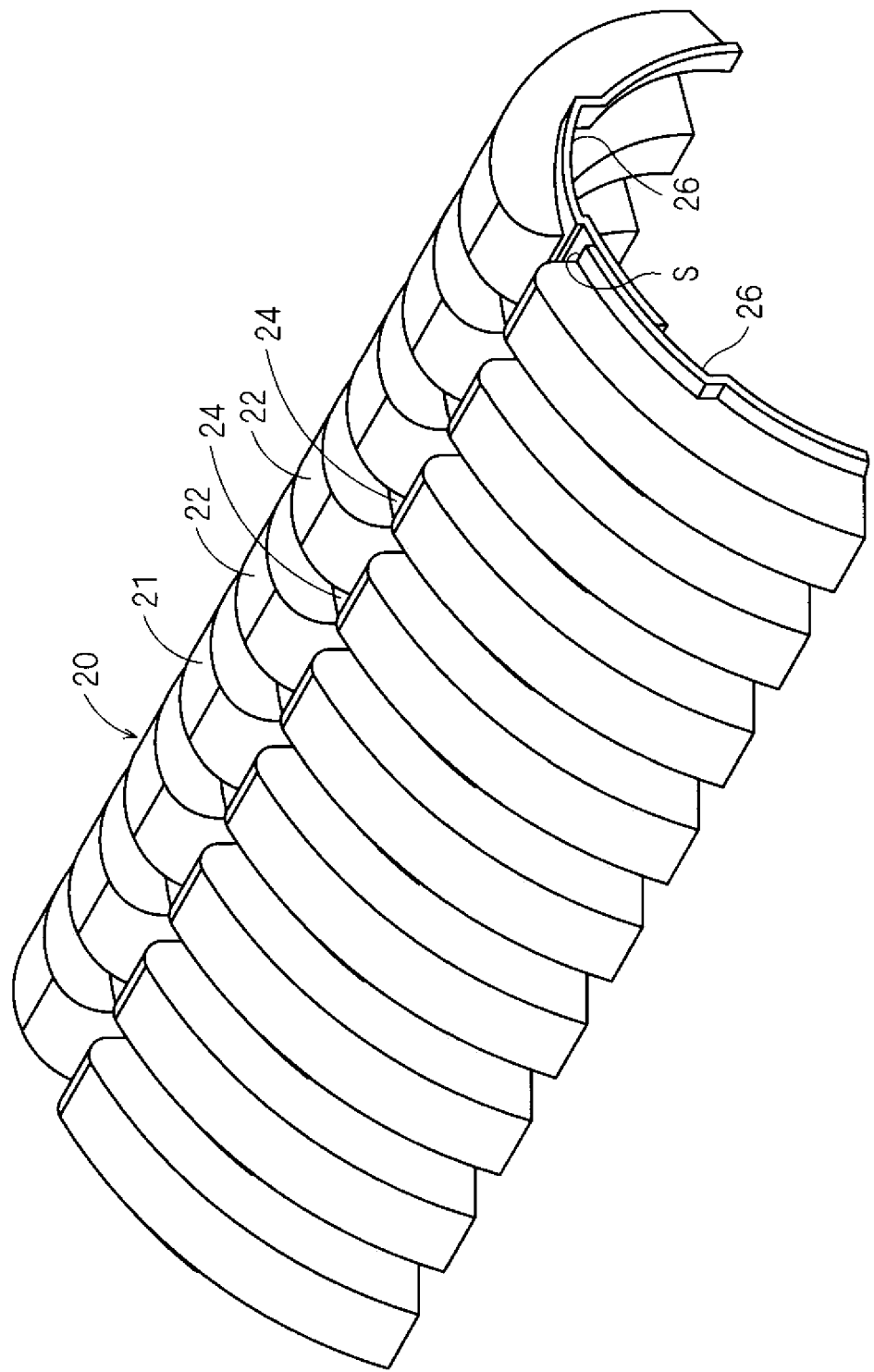
FIG. 2 is a partial perspective view of the corrugated tube.
Figure 3:
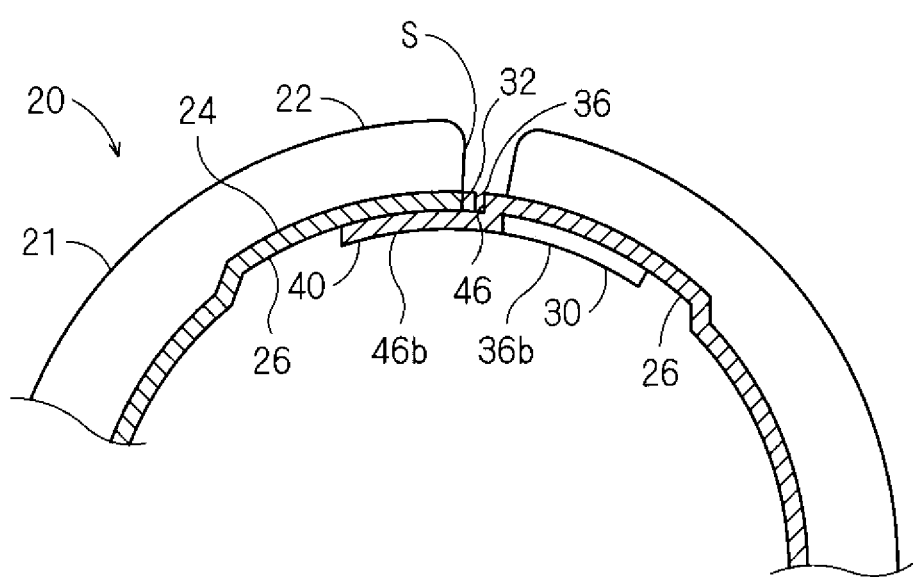
FIG. 3 is a partial cross-sectional view of the corrugated tube.
Figure 4:
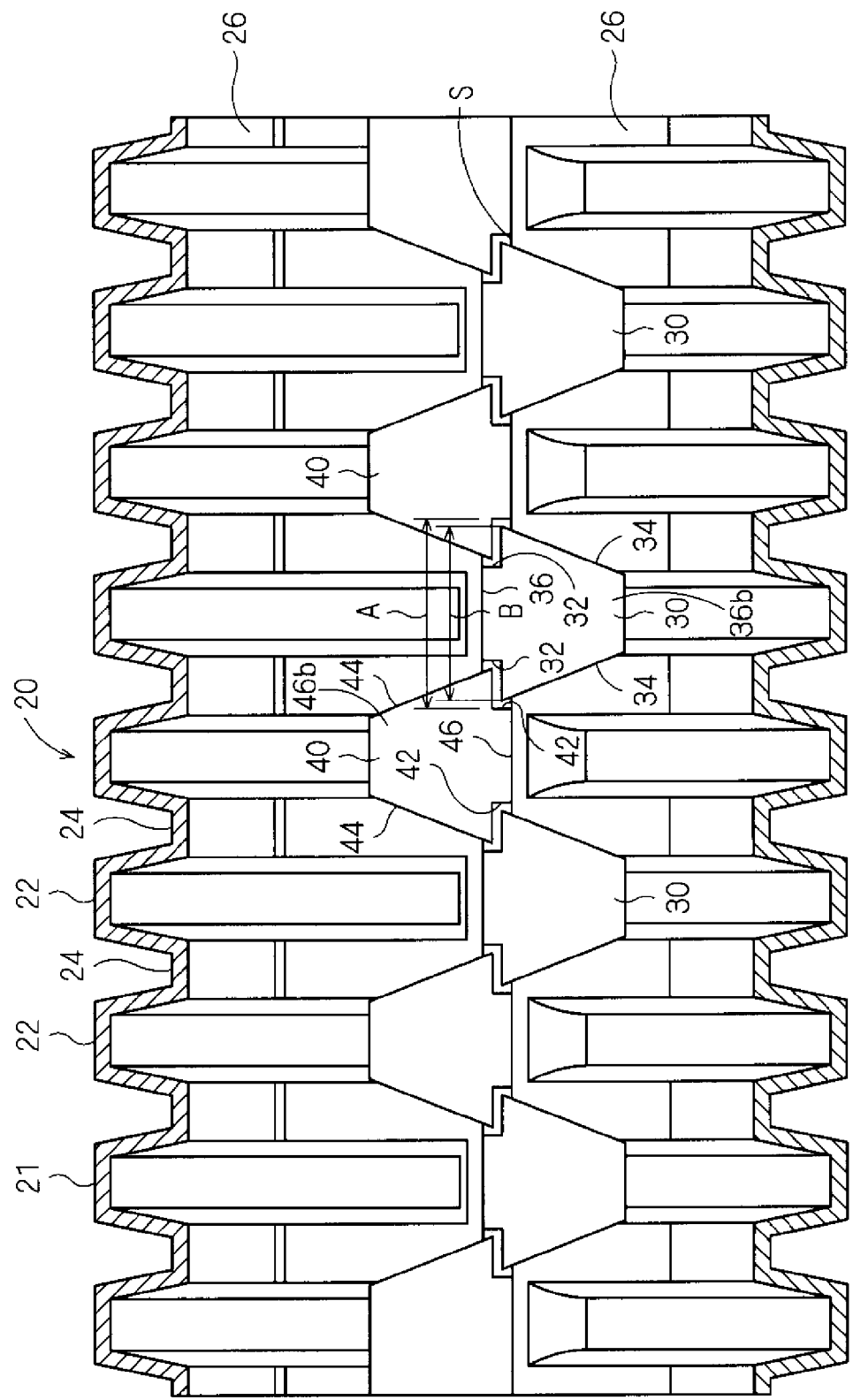
FIG. 4 is a partial explanatory diagram of a slit in the corrugated tube, as viewed from an inner peripheral side.
Figure 5:
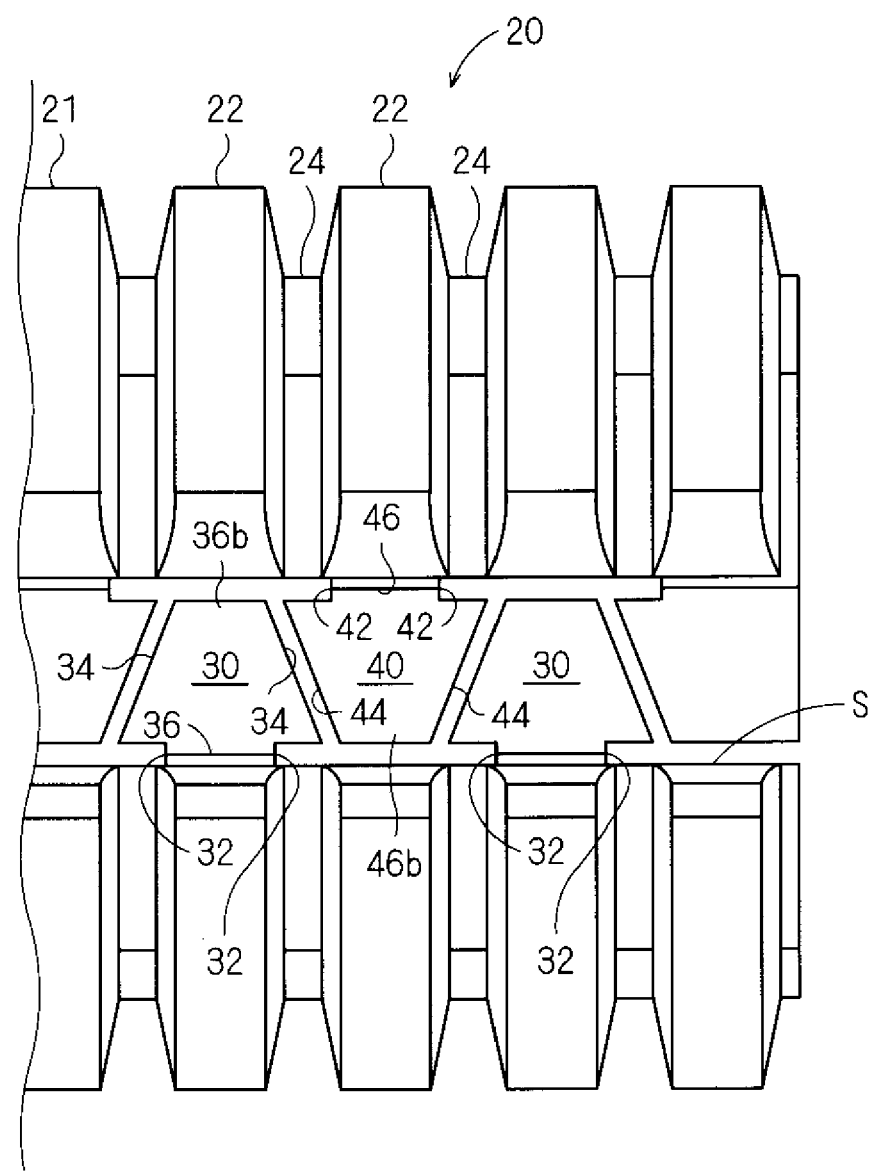
FIG. 5 is a partial plan view of the corrugated tube in a state prior to closing the slit.
Figure 6:
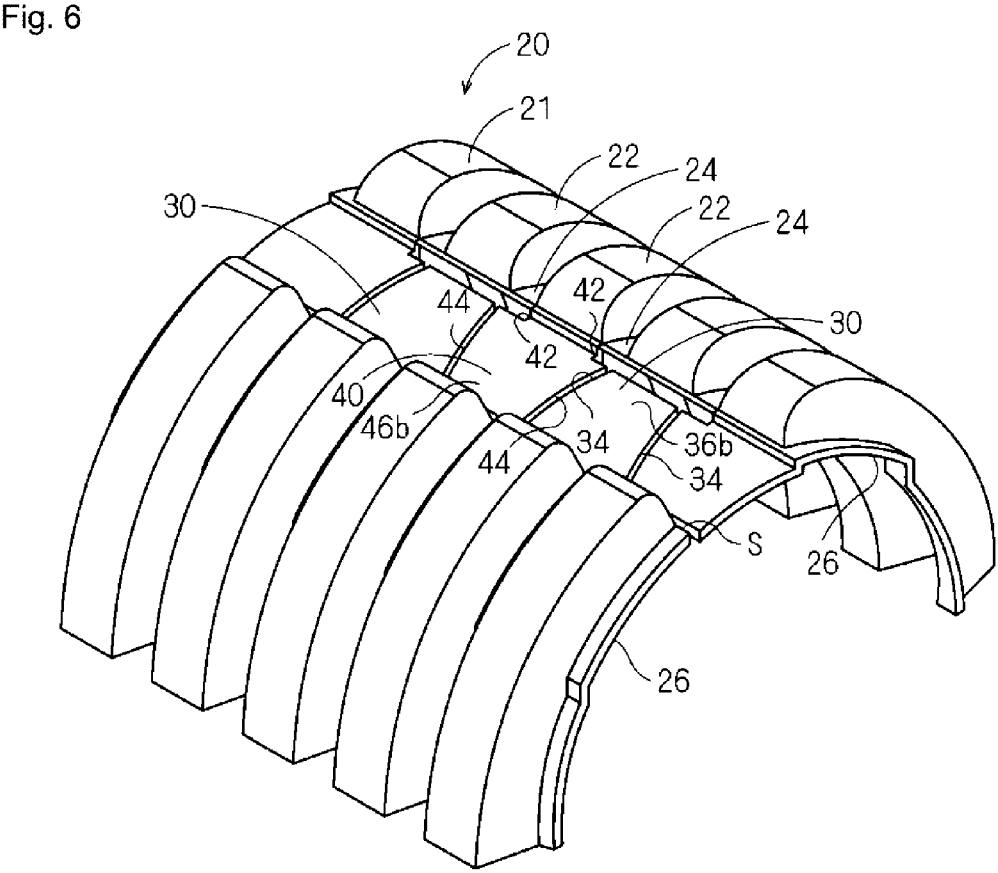
FIG. 6 is a partial perspective view of the corrugated tube.

In the following, an embodiment of a corrugated tube and a wire harness with the corrugated tube are described. FIG. 1 is partial plan view of a wire harness 10 to which a corrugated tube 32 according to the embodiment is attached. FIG. 2 is a partial perspective view of the corrugated tube 20. FIG. 3 is a partial cross-sectional view of the corrugated tube 20. FIG. 4 is a partial explanatory diagram of a slit S in the corrugated tube 20, as viewed from an inner peripheral side. FIGS. 5 to 8 illustrate the corrugated tube 20 in a state prior to being closed at the slit S, while FIGS. 9 to 12 illustrate a corrugated tube during closing at the slit S.

The corrugated tube 20 is a component covering and protecting the wire harness 10, which is routed in a vehicle or the like.

Herein, the wire harness 10 is configured by bundling a plurality of electric wires. More specifically, the wire harness 10 has a configuration in which the plurality of electric wires are bundled while being branched out according to a wiring model, which is where the electric wires are to be placed in the vehicle. The wire harness 10 does not necessarily include a branch. In addition, the wire harness 10 may be configured by a single electric wire. The wire harness 10 may also be bundled with optical cables and the like. The corrugated tube 20 is mounted on at least a portion of the wire harness 10, and may be mounted on almost the entire wire harness 10.

The corrugated tube 20 includes a corrugated tube main body 21, a plurality of first extended tabs 30, and a plurality of second extended tabs 40. The corrugated tube 20 is formed in an overall tubular shape that includes a slit S. The corrugated tube 20 is formed by, for example, extruding a molten resin in a tubular shape, then pressing the extrusion in a predetermined die using vacuum molding, blow molding, or the like. Therefore, the corrugated tube 20 is formed to have the same thickness in each portion forming a portion of the corrugated tube main body 21, which includes an annular projection 22 and an annular depression 24 described hereafter, the plurality of first extended tabs 30 and the plurality of second extended tabs 40.

The corrugated tube main body 21 is formed in a tubular shape and has the slit S formed along a length direction thereof. In other words, the corrugated tube main body 21 is formed in a tubular shape having a "C" shape in lateral cross-section. Further, the corrugated tube main body 21 has a configuration in which the annular projections 22 and the annular depressions 24 are alternatingly formed along the length direction thereof. The annular projections 22 are portions on an outer circumferential surface of the corrugated tube main body 21 projecting in a circumference direction thereof. The annular depressions 24 are portions on the outer circumferential surface of the corrugated tube main body 21 recessed in the circumference direction thereof. The annular projections 22 and the annular depressions 24 are formed so as to have identical thickness, as described above. Accordingly, when the corrugated tube main body 21 is observed from an interior side, the portions where the annular projections 22 are formed are recessed in an annular shape, while the portions where the annular depressions 24 are formed project in an annular shape.

The corrugated tube main body 21 is readily elastically deformed at a step portion between the annular projection 22 and the annular depression 24, for example, and therefore, when viewed overall, has a property of easy bending deformation. In addition, an inner diameter of the annular depression 24 is defined to be larger (typically only slightly larger) than an outer diameter of the wire harness 10 to which the corrugated tube 20 is to be mounted.

The plurality of first extended tabs 30 are formed at intervals on the corrugated tube main body 21 on one of two lateral edges of the slit S. The plurality of second extended tabs 40 are formed at intervals on the corrugated tube main body 21 on the other of the two lateral edges of the slit S.

The plurality of second extended tabs 40 are provided at each position between the plurality of first extended tabs 30 in the length direction of the corrugated tube main body 21. In other words, the plurality of first extended tabs 30 and the plurality of second extended tabs 40 are provided alternatingly in the length direction of the corrugated tube main body 21. Adjacent first extended tabs 30 and second extended tabs 40 are adjacent to each other with an incision line (a slight gap described hereafter) therebetween.

Also, the plurality of first extended tabs 30 are positioned so as to pass between the plurality of second extended tabs 40 and sink toward the inner periphery of the corrugated tube main body 21, while the plurality of second extended tabs 40 are positioned so as to pass between the plurality of first extended tabs 30 and sink toward the inner periphery of the corrugated tube main body 21. Thereby, the plurality of first extended tabs 30 and the plurality of second extended tabs 40 are fitted together so as to interlock with each other, closing the slit S.

In particular, in the present embodiment, the plurality of first extended tabs 30 and the plurality of second extended tabs 40 are formed at positions and at a pitch corresponding to the plurality of annular projections 22. More specifically, the plurality of first extended tabs 30 are formed so as to skip every other one of the plurality of annular projections 22. The plurality of second extended tabs 40 are formed so as to skip every other one of the plurality of annular projections 22, such that the plurality of second extended tabs 40 are provided between the plurality of first extended tabs 30. In addition, adjacent first extended tabs 30 and second extended tabs 40 are separated from each other at positions corresponding to the annular depressions 24. In addition, when the slit S is closed, the plurality of first extended tabs 30 and the plurality of second extended tabs 40 are provided so as to sink toward the inner periphery of the annular projection 22 opposite each.

Moreover, the first extended tabs 30 and the second extended tabs 40 may be formed at positions and at a pitch unrelated to those of the annular projections 22 and the annular depressions 24.

A first engagement notch 32 is formed on two lateral portions of the first extended tab 30. Herein, the first extended tab 30 is formed in a plate shape, and on two lateral portions of a base end thereof is recessed in a linear shape toward a width-direction center portion of the first extended tab 30 to form the first engagement notch 32. More specifically, in a plan view of the first extended tab 30, the first engagement notch 32 is formed in a shape recessed in a rectangular shape, and one lateral edge of the first engagement notch 32 is positioned on the same straight line as an outer edge of one of two lateral edges having the slit S therebetween.

In addition, a second engagement notch 42 is formed on two lateral portions of the second extended tab 40. The second extended tab 40 and the second engagement notch 42 are formed to have the same shape as the first extended tab 30 and the first engagement notch 32, respectively.

In addition, in a state where the plurality of first extended tabs 30 and the plurality of second extended tabs 40 are fitted together as noted above, when the base end portion of the first extended tab 30 and the base end portion of the second extended tab 40 are provided at positions overlapping in the circumference direction of the corrugated tube main body 21, the mutually adjacent first engagement notch 32 and second engagement notch 42 engage with each other. Thereby, a state of engagement between the plurality of first extended tabs 30 and the plurality of second extended tabs 40 is maintained.

In addition, a pair of guiding lateral portions 34 are formed on both lateral portions of the first extended tab 30, the guiding lateral portions 34 being formed so as to approach an interior toward a forefront end of the first extended tab 30. Herein, both lateral portions of the first extended tab 30 are formed into the guiding lateral portions 34, which are inclined inward toward the forefront end of the first extended tab 30. In addition, herein, the forefront edge of the first extended tab 30 extends in a direction orthogonal to an extension direction of the first extended tab 30. Specifically, the first extended tab 30 has a trapezoidal shape in a plan view.

In addition, a pair of guiding lateral portions 44 are formed on both lateral portions of the second extended tab 40, the guiding lateral portions 44 being formed so as to approach an interior toward a forefront end of the second extended tab 40. Herein, both lateral portions of the second extended tab 40 are formed into the guiding lateral portions 44, which are inclined inward toward the forefront end of the second extended tab 40. In addition, herein, the forefront edge of the second extended tab 40 extends in a direction orthogonal to an extension direction of the second extended tab 40. Specifically, the second extended tab 40 has a trapezoidal shape in a plan view.

In addition, when the plurality of first extended tabs 30 and the plurality of second extended tabs 40 are inserted into respective gaps therebetween, each of the guiding lateral portions 34 and 44 makes sliding contact with the opposing guiding lateral portions 34 and 44, the first engagement notch 32, and the second engagement notch 42. Accordingly, the work of inserting the plurality of first extended tabs 30 and the plurality of second extended tabs 40 can be performed smoothly.

Moreover, the guiding lateral portions 34 and 44 are not necessarily inclined in a straight line shape, and may instead have a shape that curves while approaching the interior toward the forefront end of the first extended tab 30 or the second extended tab 40.

Moreover, a dimension A between troughs of two mutually opposing first engagement notches 32 formed on opposing portions of adjacent first extended tabs 30 is defined to be larger than a maximum width dimension B of the second extended tab 40 fitted therebetween (see FIG. 4). Accordingly, the second extended tab 40 can be smoothly inserted between adjacent first extended tabs 30 and between two adjacent first engagement notches 32.

However, the dimension A between troughs of two mutually opposing first engagement notches 32 may also be defined to be equal to or smaller than the maximum width dimension B of the second extended tab 40 fitted therebetween. Even in such a case, the first extended tab 30 and the second extended tab 40 are elastically deformed, and thereby the second extended tab 40 can be inserted between adjacent first extended tabs 30 and between two adjacent first engagement notches 32.

Similarly, a dimension between troughs of two mutually opposing first engagement notches 42 formed on opposing portions of adjacent second extended tabs 40 is defined to be larger than a maximum width dimension of the first extended tab 30 fitted therebetween. Of course, this is not necessarily required.

Figure 7:
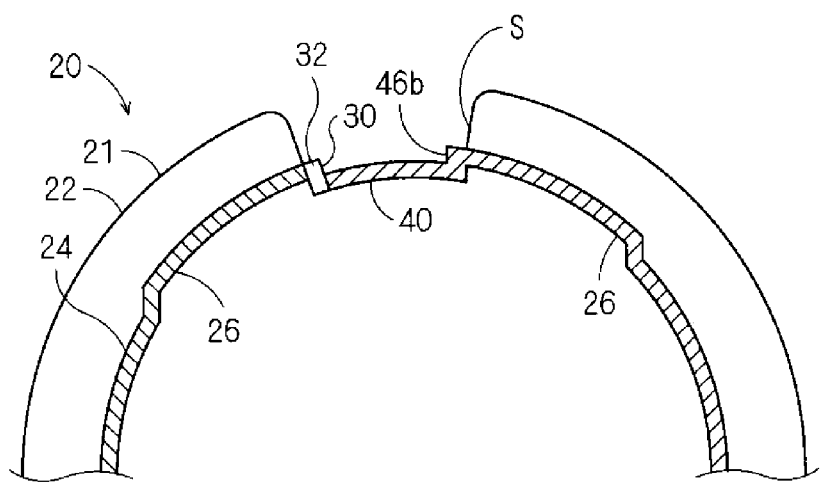
FIG. 7 is a partial cross-sectional view of the corrugated tube.
Figure 8:
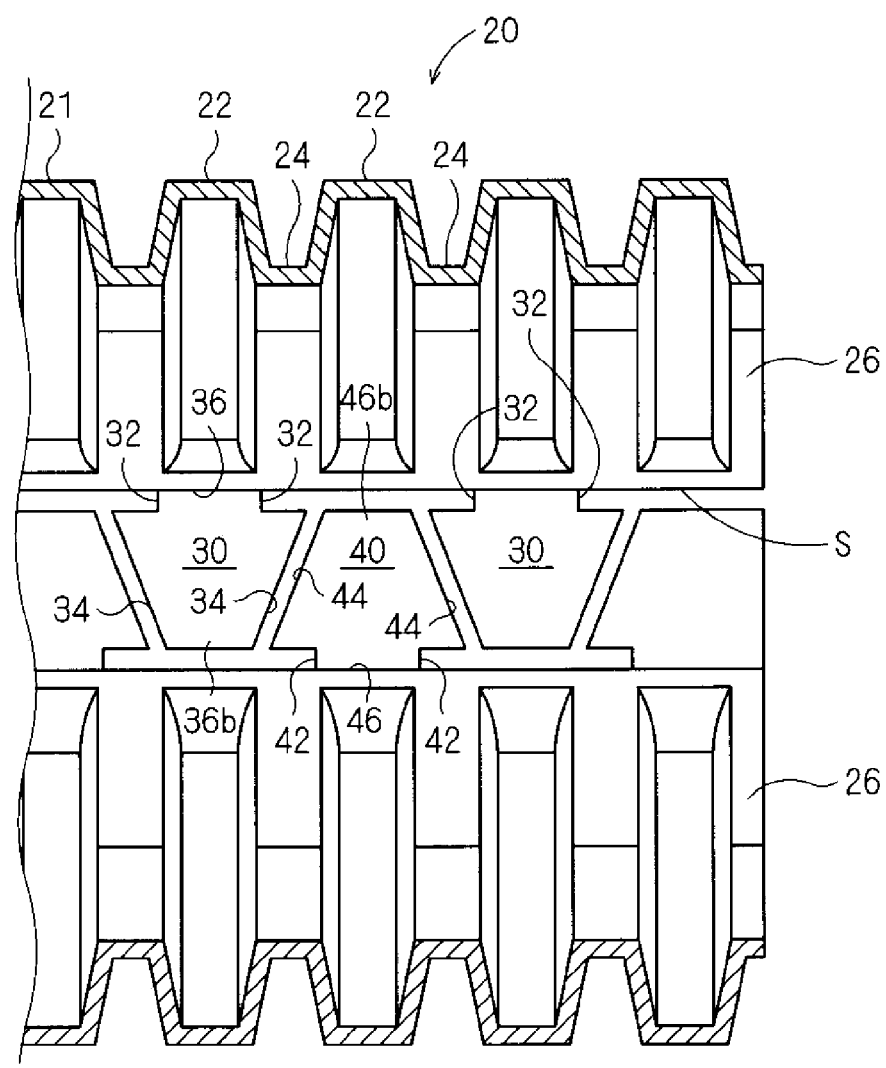
FIG. 8 is a partial explanatory diagram of the slit in the corrugated tube, as viewed from the inner peripheral side.
Figure 9:
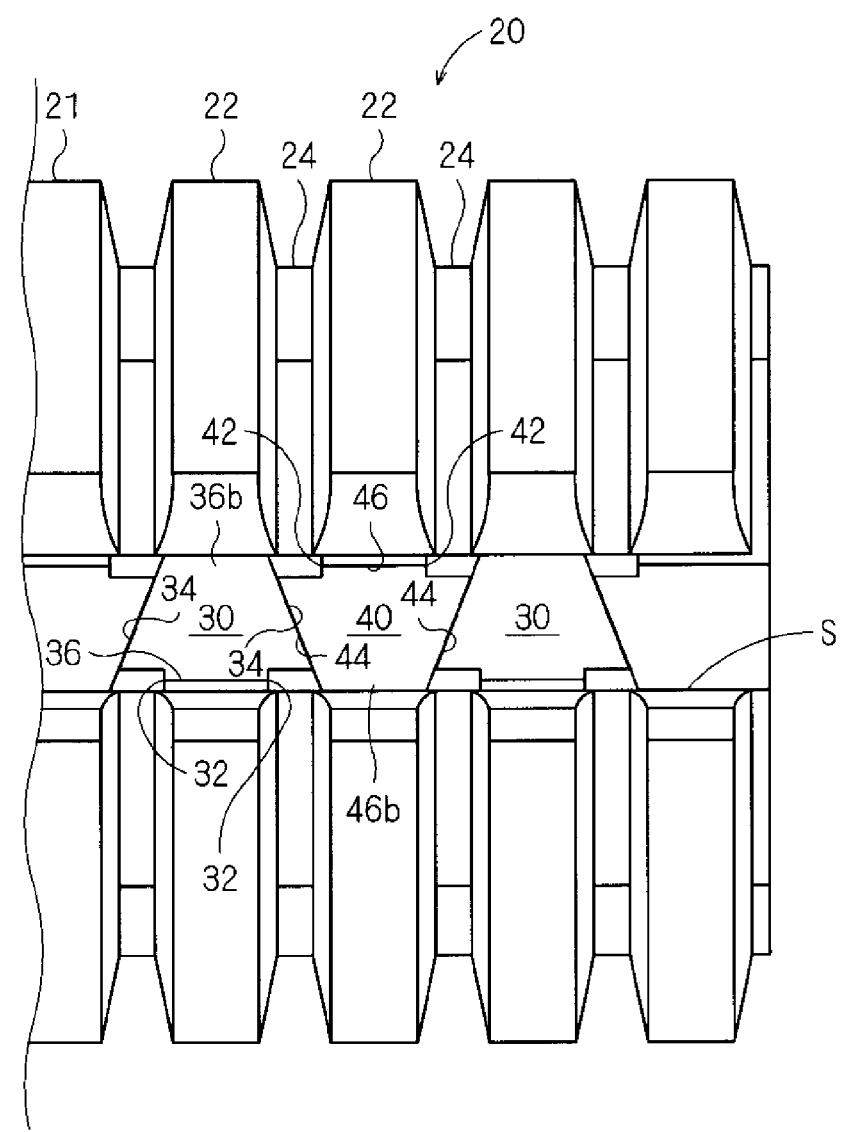
FIG. 9 is a partial plan view of the corrugated tube during closing of the slit.
Figure 10:
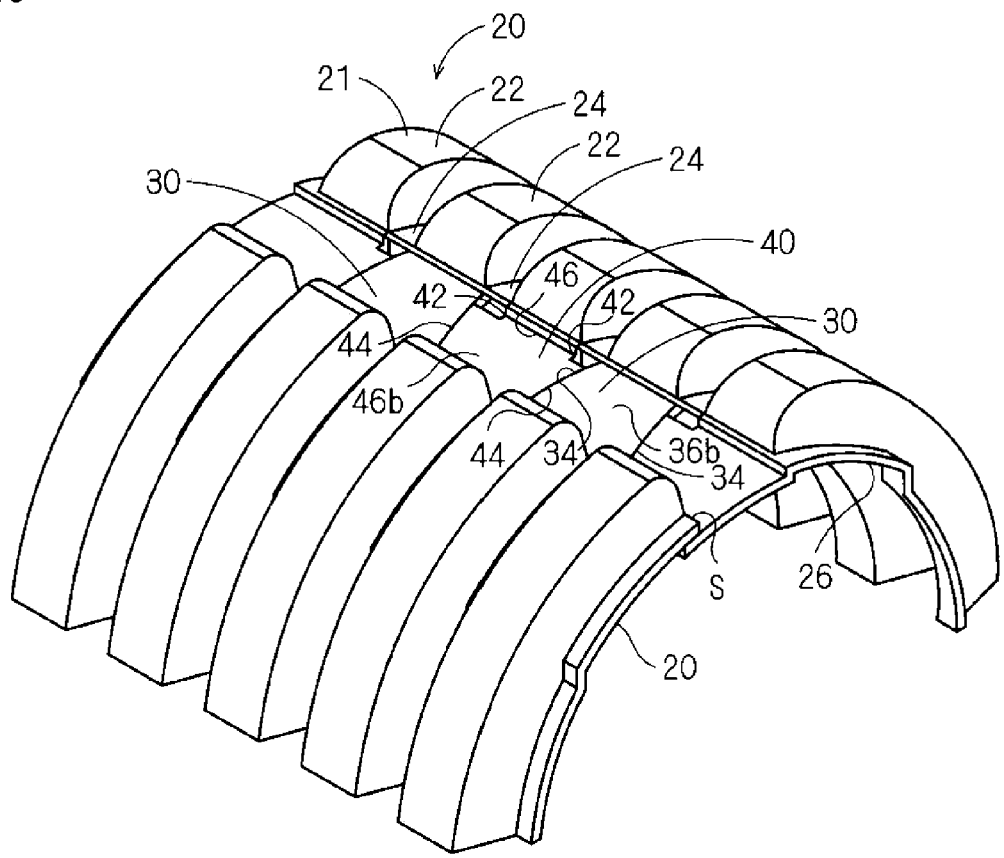
FIG. 10 is a partial perspective view of the corrugated tube.
Figure 11:
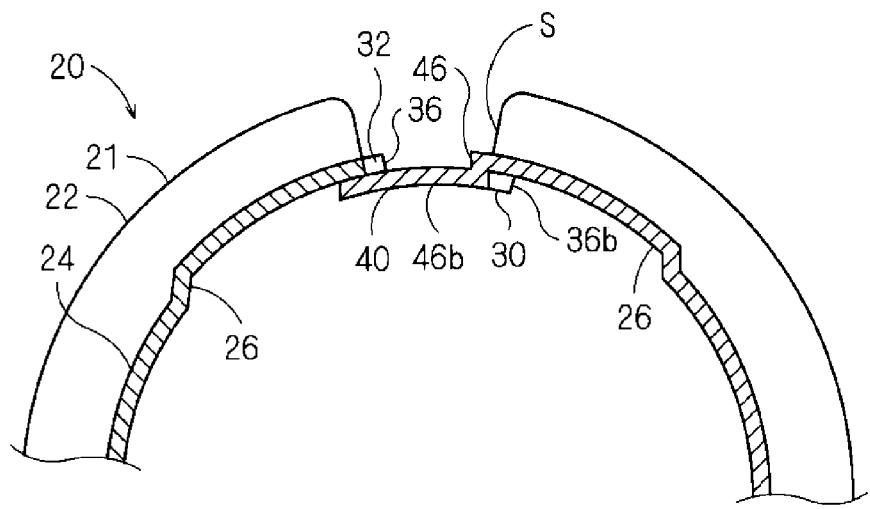
FIG. 11 is a partial cross-sectional view of the corrugated tube.
Figure 12:
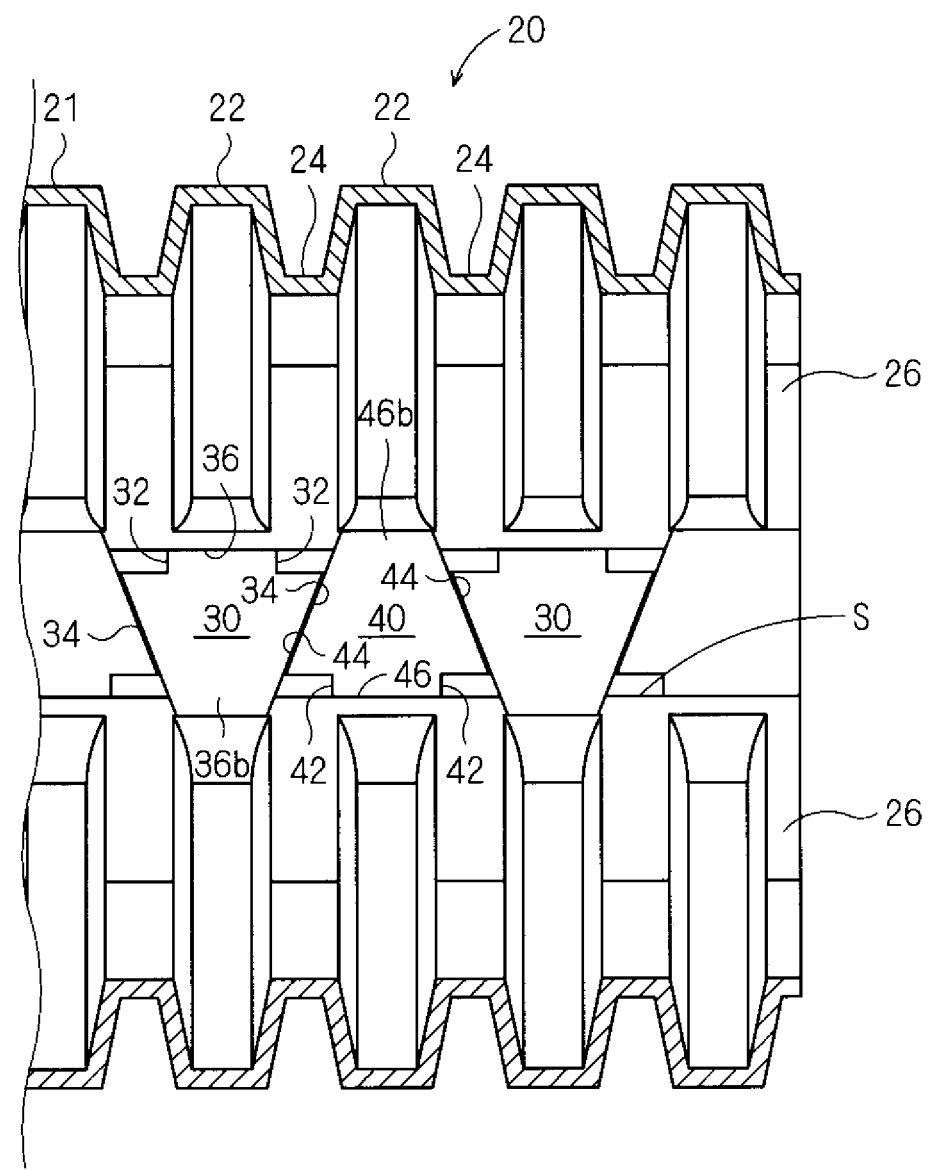
FIG. 12 is a partial explanatory diagram of the slit in the corrugated tube, as viewed from the inner peripheral side.

In addition, the first extended tab 30 is recessed toward the inner periphery of the corrugated tube main body 21, via a step portion 36, at a portion where the first engagement notch 32 is formed (more specifically, at a portion between two first engagement notches 32; see FIGS. 3, 7, and 11). The first extended tab 30 includes a portion 36b closer to the forefront end than the step portion 36, the portion 36b being recessed toward the inner periphery of the corrugated tube main body 21 by a thickness amount of the first extended tab 30 and more than a portion toward the base end (annular depression 24, which is an inner peripheral portion of the corrugated tube main body 21). In addition, the portion 36b toward the forefront end of the first extended tab 30 is formed in a plate shape curved along the circumference direction of the corrugated tube main body 21.

Similarly, the second extended tab 40 is recessed toward the inner periphery of the corrugated tube main body 21, via a step portion 46, at a portion where the second engagement notch 42 is formed (see FIGS. 3, 7, and 11). The second extended tab 40 includes a portion 46b closer to the forefront end than the step portion 46, the portion 46b being recessed toward the inner periphery of the corrugated tube main body 21 by a thickness amount of the second extended tab 40 and more than a portion toward the base end (annular depression 24, which is an inner peripheral portion of the corrugated tube main body 21). In addition, the portion 46b toward the forefront end of the second extended tab 40 is formed in a plate shape curved along the circumference direction of the corrugated tube main body 21.

In addition, in a state where the first extended tabs 30 and the second extended tabs 40 are fitted together, the first engagement notches 32 and the second engagement notches 42 are mutually engaged at the position of the step portions 36 and 46. In this state, the portion 36b toward the forefront end of the first extended tab 30 and the portion 46b toward the forefront end of the second extended tab 40 are provided at positions one step down toward the inner periphery of the corrugated tube main body 21 (see FIG. 3). Also, portions toward the base end on two lateral portions of the portion 36b toward the forefront end (portions on two sides of the trapezoidal base) and portions toward the base end on two lateral portions of the portion 46b toward the forefront end (portions on two sides of the trapezoidal base) are provided at mutually opposing positions (see FIG. 3). In addition, when a force is applied sufficient to open the corrugated tube main body 21 at the slit S, the portions toward the base end on two lateral portions of the portion 36b toward the forefront end and the portions toward the base end on two lateral portions of the portion 46b toward the forefront end abut each other, and the mutual engagement of the first engagement notch 32 and the second engagement notch 42 becomes more reliable. Thereby, opening of the slit S is more reliably controlled.

However, even when the first extended tab 30 and the second extended tab 40 have a shape not recessed toward the inner periphery of the corrugated tube main body 21 via the step portions 36 and 46, by elastically deforming the first extended tab 30 and the second extended tab 40 while fitting these components together, the first engagement notch 32 and the second engagement notch 42 are mutually engaged. Therefore, recessing the first extended tab 30 and the second extended tab 40 toward the inner periphery of the corrugated tube main body 21 via the step portions 36 and 46 is not necessarily required.

Moreover, the present embodiment is described by way of an example in which the first extended tab 30 and the second extended tab 40 have a symmetrical form with positions offset in the length direction of the corrugated tube main body 21. However, this is not necessarily required.

In addition, a depression 26 is formed on a portion of the inner periphery of the corrugated tube main body 21, the plurality of first extended tabs 30 or the plurality of second extended tabs 40 being positioned in the depression 26 in a state where the plurality of first extended tabs 30 and the plurality of second extended tabs 40 are fitted together.

In a state where the first extended tab 30 and the second extended tab 40 are fitted together, the portion 36b toward the forefront end of the first extended tab 30 is positioned on the inner periphery of the corrugated tube main body 21, and the portion 46b toward the forefront end of the second extended tab 40 is positioned on the inner periphery of the corrugated tube main body 21. Therefore, when no particular measures are put in place, the first extended tab 30 and the second extended tab 40 protrude by a thickness amount thereof on the inner periphery of the corrugated tube main body 21. Thus, a depression corresponding to the thickness of the first extended tab 30 or the second extended tab 40 is formed at portions of the inner periphery of the corrugated tube main body 21 having the slit S therebetween, forming the depression 26.

In the present embodiment, the depression 26 is formed on the inner peripheral portion of the corrugated tube main body 21 on two lateral edge portions having the slit S therebetween (i.e., inner peripheral portions of each of the annular depressions 24), the depression 26 being recessed continuously in the length direction of the corrugated tube main body 21. In the circumference direction of the corrugated tube main body 21, the depression 26 is formed into a depression equal to or greater than a length dimension of the portion 36b toward the forefront end of the first extended tab 30 or the portion 36b toward the forefront end of the second extended tab 40.

The corrugated tube 20 described above can be manufactured as follows, for example. Specifically, an annular corrugated tube intermediate product is manufactured having the plurality of first extended tabs 30 and the plurality of second extended tabs 40 integrally connected to the corrugated tube main body 21 (in FIG. 5, a structure is imagined in which the plurality of first extended tabs 30 and the plurality of second extended tabs 40 are integrated with the corrugated tube main body 21). This corrugated tube intermediate product can be formed by extruding a molten resin in a tubular shape, then pressing the extrusion in a predetermined die using vacuum molding, blow molding, or the like. An apparatus for manufacturing the corrugated tube intermediate product can be achieved by modifying the die, for example, in a commonly used vacuum molding apparatus for corrugated tube molding.

When the corrugated tube intermediate product is cut between the first extended tabs 30 and the second extended tabs 40, between the corrugated tube main body 21 and the first extended tabs 30 and second extended tabs 40, and then at portions where the first engagement notches 32 and the second engagement notches 42 are to be formed, as shown in FIGS. 5 to 8, the corrugated tube 20 can be manufactured having the plurality of first extended tabs 30 formed on one of two lateral edges having the straight line-shaped slit S therebetween, and having the plurality of second extended tabs 40 formed on the other of the two lateral edges. Moreover, the cutting can be performed by laser machining, a shearing blade, or the like. In particular, by cutting various cutting locations in a straight line shape, the cutting process can be readily performed.

The corrugated tube 20 described above may also be manufactured by a generic injection molding die or the like.

Operations when mounting the corrugated tube 20 having such a configuration onto the wire harness 10 are described.

Specifically, in a state where the wire harness 10 is provided within the corrugated tube 20, as shown in FIGS. 9 to 12, in a state where the plurality of first extended tabs 30 and the plurality of second extended tabs 40 are provided between each other, two lateral edges of the corrugated tube main body 21 are brought close and the plurality of first extended tabs 30 are slipped toward the inner peripheral side of the opposing lateral edge, while the plurality of second extended tabs 40 are slipped toward the inner peripheral side of the opposing lateral edge. In addition, as shown in FIGS. 1 to 4, when the plurality of first extended tabs 30 and the plurality of second extended tabs 40 are deeply inserted and the base end portion of the plurality of first extended tabs 30 and the base end portion of the plurality of second extended tabs 40 are provided at positions mutually overlapping in the circumference direction of the corrugated tube main body 21, the first engagement notches 32 and second extended tabs 40 engage with each other. More specifically, the portion of the first engagement notch 32 toward the base end of the first extended tab 30 and the portion of the second engagement notch 42 toward the base end of the second extended tab 40 are mutually opposing. Accordingly, displacement of the plurality of first extended tabs 30 and the plurality of second extended tabs 40 in a mutually disengaging direction is inhibited, and opening of the slit S is inhibited. In addition, the first extended tabs 30 provided to one of two lateral edges having the slit S therebetween are positioned on the inner peripheral portion of the other of the two lateral edges, while the second extended tabs 40 provided to the other of the two lateral edges are positioned on the inner peripheral portion of the first of the two lateral edges. Therefore, the two lateral edges having the slit S therebetween are unlikely to undergo positional drift in a diameter direction of the corrugated tube main body 21.

According to the corrugated tube 20 and the wire harness 10 with the corrugated tube 20 configured as described above, the plurality of first extended tabs 30 and the plurality of second extended tabs 40 are fitted together so as to be inserted into respective gaps therebetween, thereby engaging the first engagement notch 32 with the second engagement notch 42. In this state, the two lateral edges having the slit S therebetween are unlikely to undergo positional drift in the diameter direction of the corrugated tube 20. Therefore, a situation is unlikely to occur in which one of the two lateral edges having the slit S therebetween sinks to the interior side of the other of the two lateral edges. Also, even when affected by a force in the diameter direction of the corrugated tube 20 displacing the two lateral edges having the slit S therebetween, the engagement between the first engagement notch 32 and the second engagement notch 42 is unlikely to be released. Therefore, a closed state of the slit S is stable and can be maintained unaltered. Naturally, because the plurality of first extended tabs 30 and the plurality of second extended tabs 40 are also fitted together in the length direction of the corrugated tube main body 21, the two lateral edges having the slit S therebetween are also unlikely to displace in the length direction of the corrugated tube main body 21.

In addition, as disclosed in Patent Literature 1, a lock structure using a lock projection formed on one of two end portions having a slit therebetween encountered the following concerns. Specifically, in a case where an uneven shape including the lock projection and an indentation to receive the lock projection was formed on a corrugated tube, coordinating conditions during production (e.g., production line speed, amount of resin discharged, air discharge pressure during blow forming, and the like) was extremely difficult. In addition, when such a corrugated tube was molded using a die, separability was degraded due to the uneven shape. Further, due to a projection height of the lock projection, fluctuation was anticipated in retention force in a state where the lock projection was fitted into the indentation. Therefore, stabilizing the shape of the lock projection is important, requiring stricter than usual manufacturing quality control in this regard.

In contrast, the corrugated tube 20 according to the present embodiment has a structure in which the first engagement notch 32 formed on a lateral portion of the first extended tab 30 and the second engagement notch 42 formed on a lateral portion of the second extended tab 40 are engaged, closing the slit S. Therefore, there are few unevenness processing portions to be newly formed on the corrugated tube 20. Thus, the corrugated tube 20 is unlikely to lead to difficulty in coordinating conditions during production. In addition, because this is not an engagement structure using portions projecting in the diameter direction of the corrugated tube 20, there is less necessity to strictly monitor height of the unevenness when die molding in order to achieve a constant retention force that closes the slit S. Thus, strict manufacturing quality control is less likely to be required than in a typical case.

In addition, the guiding lateral portions 34 are formed on the plurality of first extended tabs 30 and the plurality of second extended tabs 40, the guiding lateral portions 34 advancing inward toward the forefront ends of the first extended tabs 30 and the second extended tabs 40. Therefore, the plurality of first extended tabs 30 and the plurality of second extended tabs 40 can be readily inserted between each other.

In addition, in a state where the plurality of first extended tabs 30 and the plurality of second extended tabs 40 are fitted together, the depression 26 is formed in a portion of the corrugated tube main body 21 where the plurality of first extended tabs 30 or the plurality of second extended tabs 40 are positioned. Therefore, projection of the first extended tabs 30 and the second extended tabs 40 toward the inner periphery of the corrugated tube main body 21 is controlled.

However, the corrugated tube main body 21 is not necessarily recessed at the depression 26.

In addition, the plurality of first extended tabs 30 are recessed toward the inner periphery of the corrugated tube main body 21 via the step portion 36 at a position where the first engagement notch 32 is provided, while the plurality of second extended tabs 40 are recessed toward the inner periphery of the corrugated tube main body 21 via the step portion 46 at a position where the second engagement notch 42 is provided. Therefore, the first engagement notch 32 and the second engagement notch 42 engage with each other at the position of the step portions 36 and 46, respectively. Thus, the first engagement notch 32 and the second engagement notch 42 can be more reliably engaged and opening of the slit S can be more reliably controlled.

In addition, the dimension A between troughs of two mutually opposing first engagement notches 32 or second engagement notches 42 is larger than the maximum width dimension B of the second extended tab 40 or the first extended tab 30 respectively fitted therebetween. Therefore, at least one of the plurality of first extended tabs 30 and the plurality of second extended tabs 40 can be readily inserted between two mutually opposing first engagement notches 32 or second engagement notches 42.

Moreover, lateral portions of the first extended tab 30 and the second extended tab 40 are not necessarily formed into the guiding lateral portions 34 and 44 described above, and may instead extend straight in an extension direction of the first extended tab 30 and the second extended tab 40. In addition, the guiding lateral portions 34 and 44 may also be formed on only one of the first extended tab 30 and the second extended tab 40. In addition, the guiding lateral portions 34 and 44 may also be formed on only one lateral portion of the first extended tab 30 and the second extended tab 40.

A modification related to a shape of a lateral portion of a first extended tab 130 and a second extended tab 140 is described.

Figure 13:
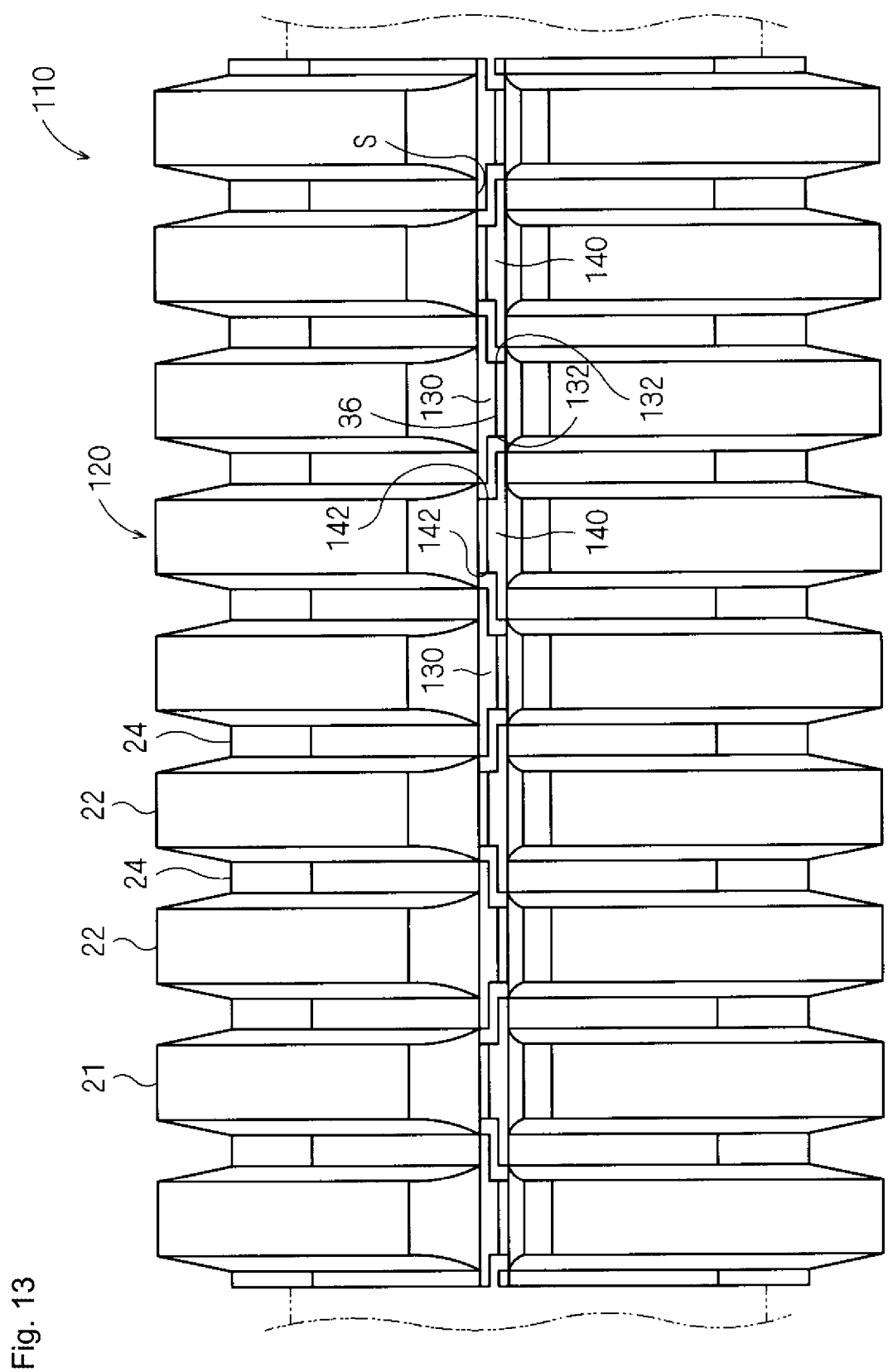
FIG. 13 is a partial plan view of a wire harness to which a corrugated tube according to a modified example is attached.
Figure 14:
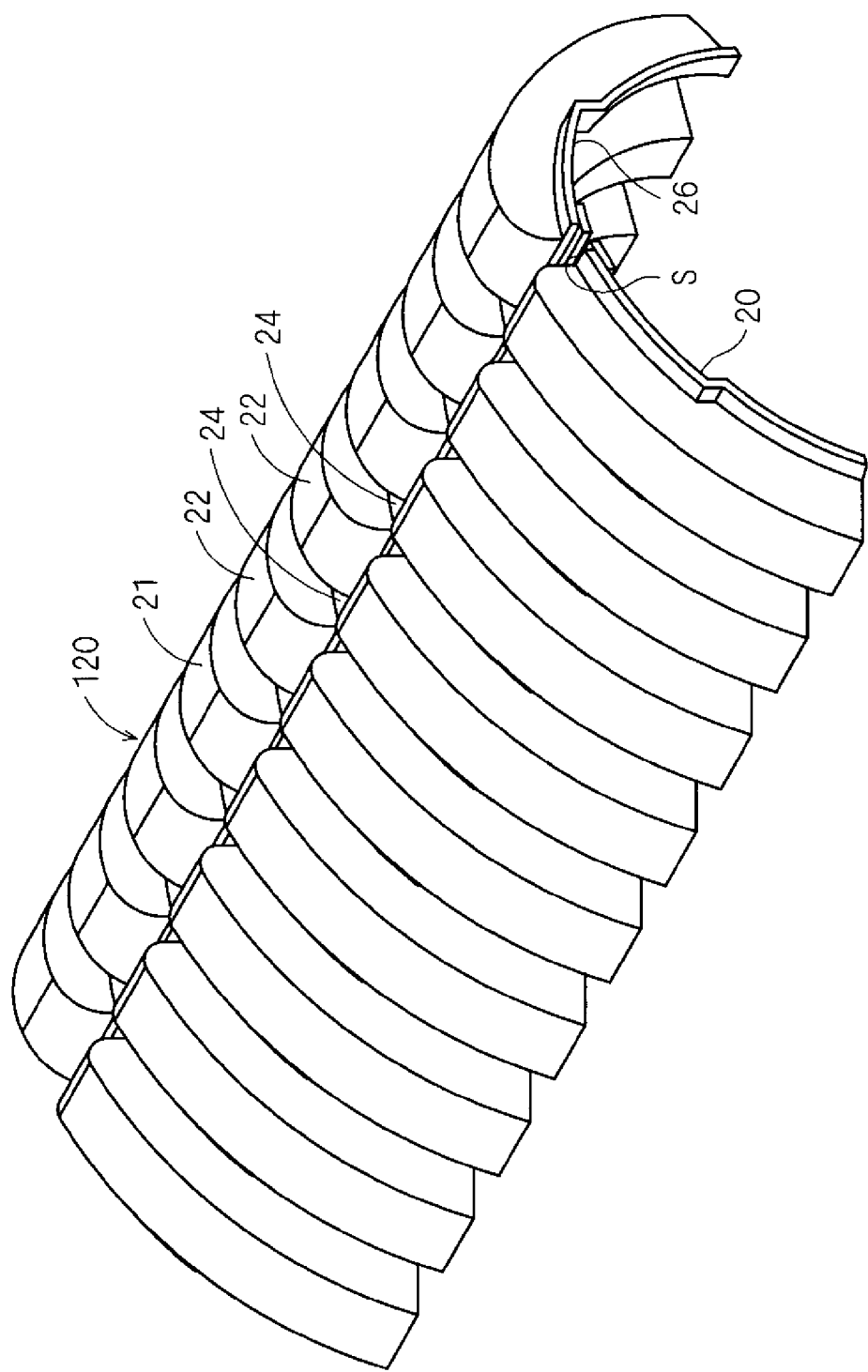
FIG. 14 is a partial perspective view of the corrugated tube.
Figure 15:
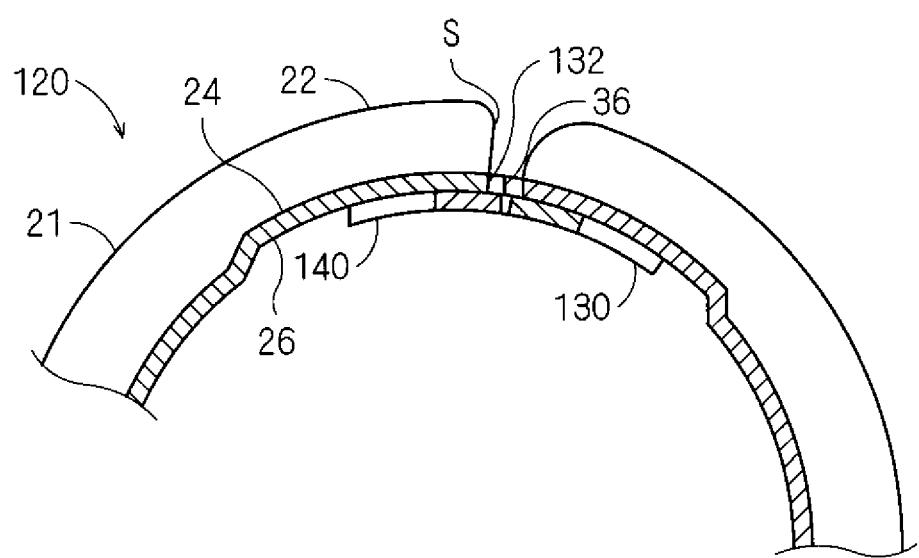
FIG. 15 is a partial cross-sectional view of the corrugated tube.
Figure 16:
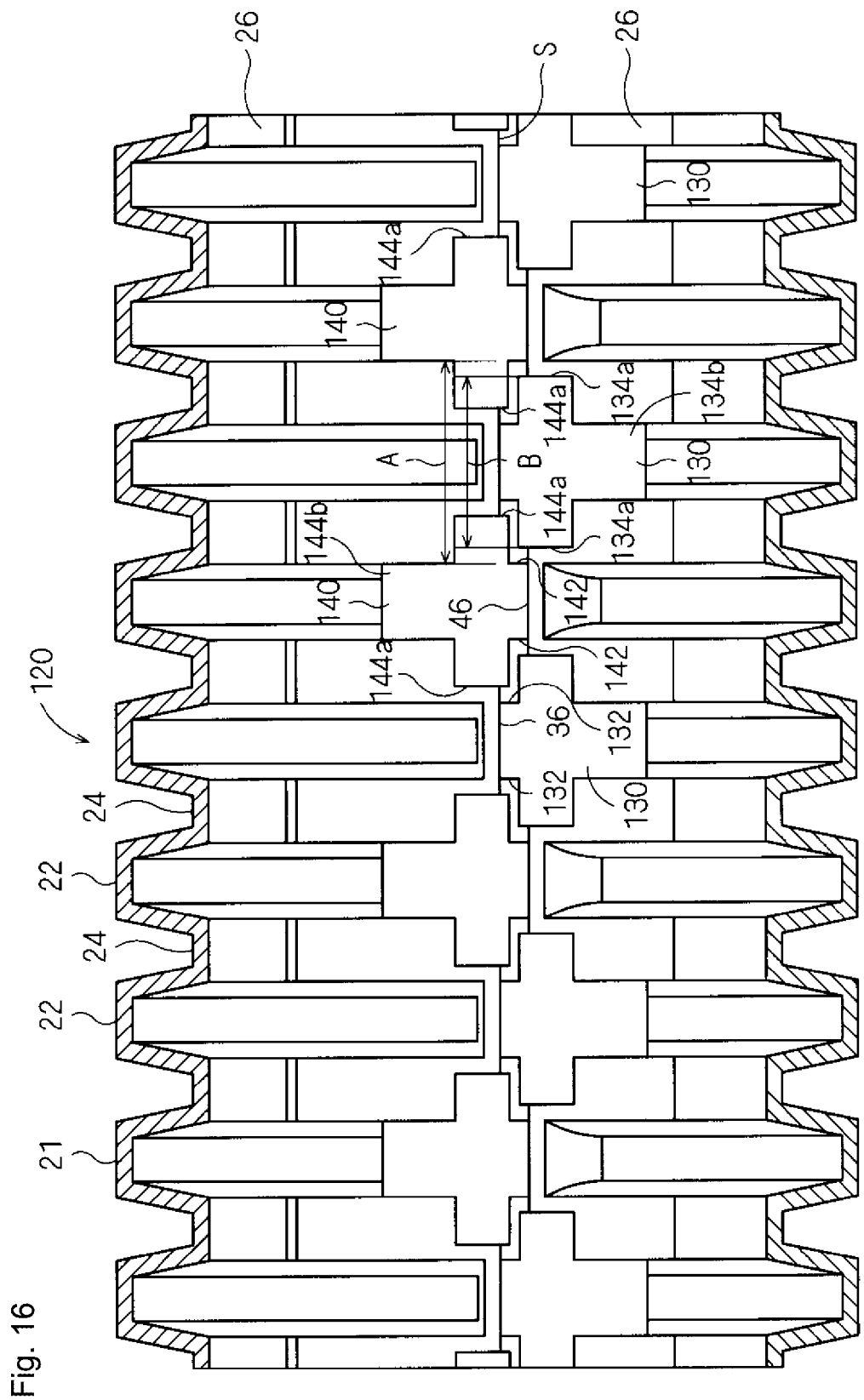
FIG. 16 is a partial explanatory diagram of a slit in the corrugated tube, as viewed from an inner peripheral side.
Figure 17:
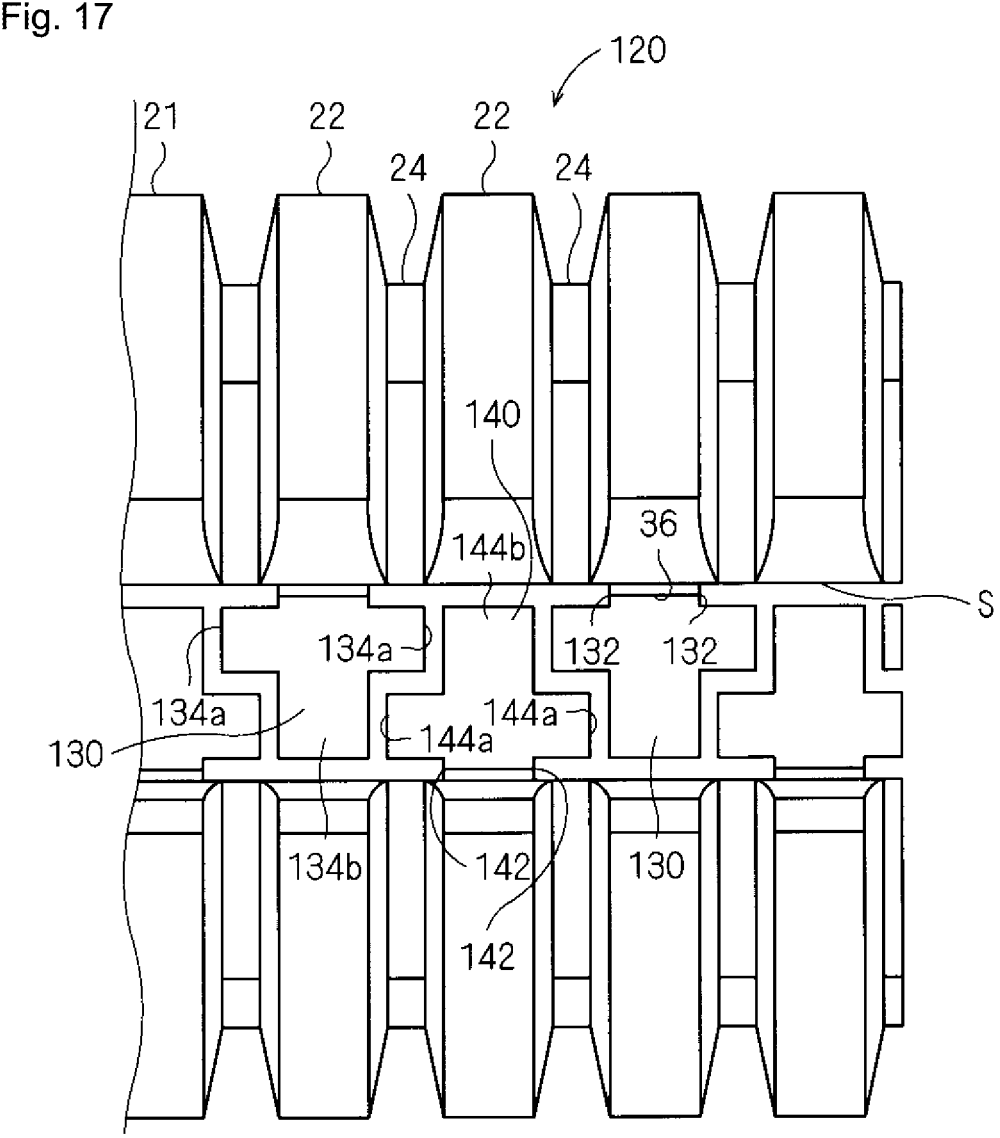
FIG. 17 is a partial plan view of the corrugated tube in a state prior to closing the slit.
Figure 18:
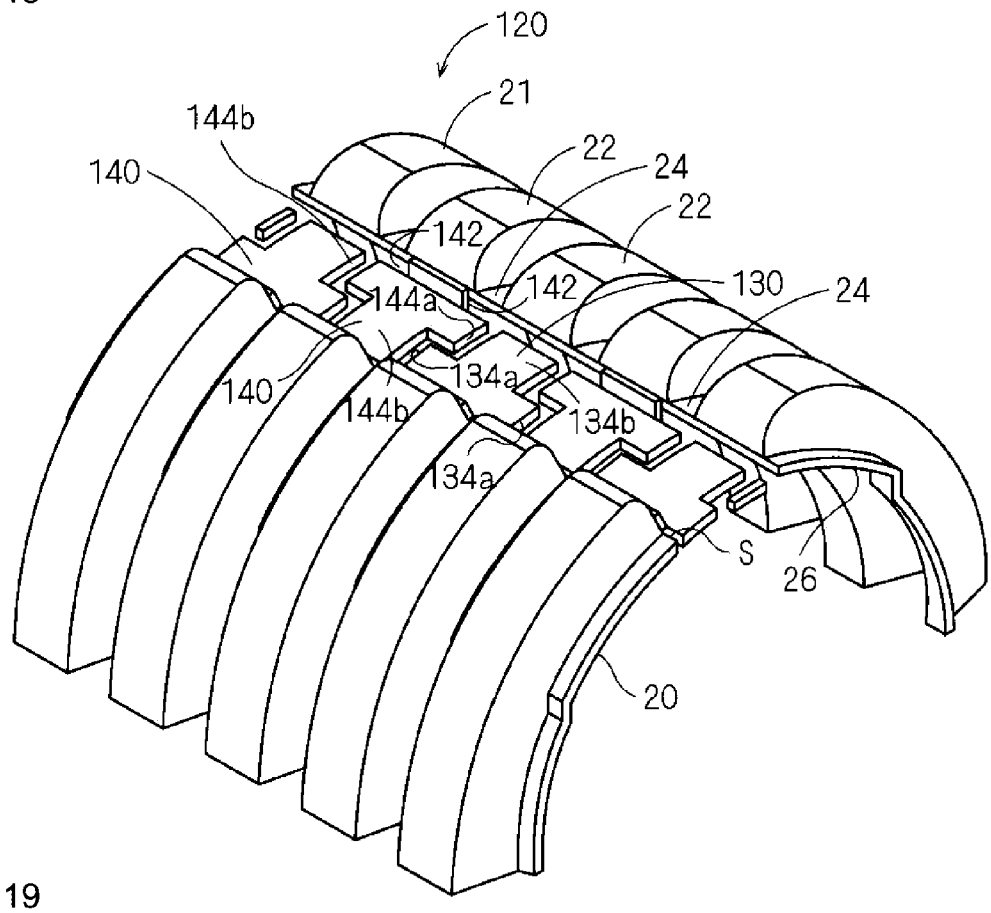
FIG. 18 is a partial perspective view of the corrugated tube.
Figure 19:
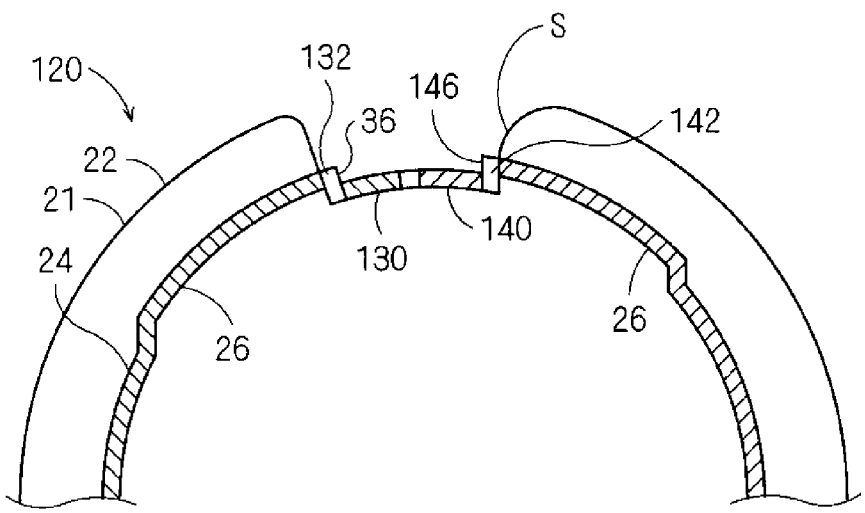
FIG. 19 is a partial cross-sectional view of the corrugated tube.
Figure 20:
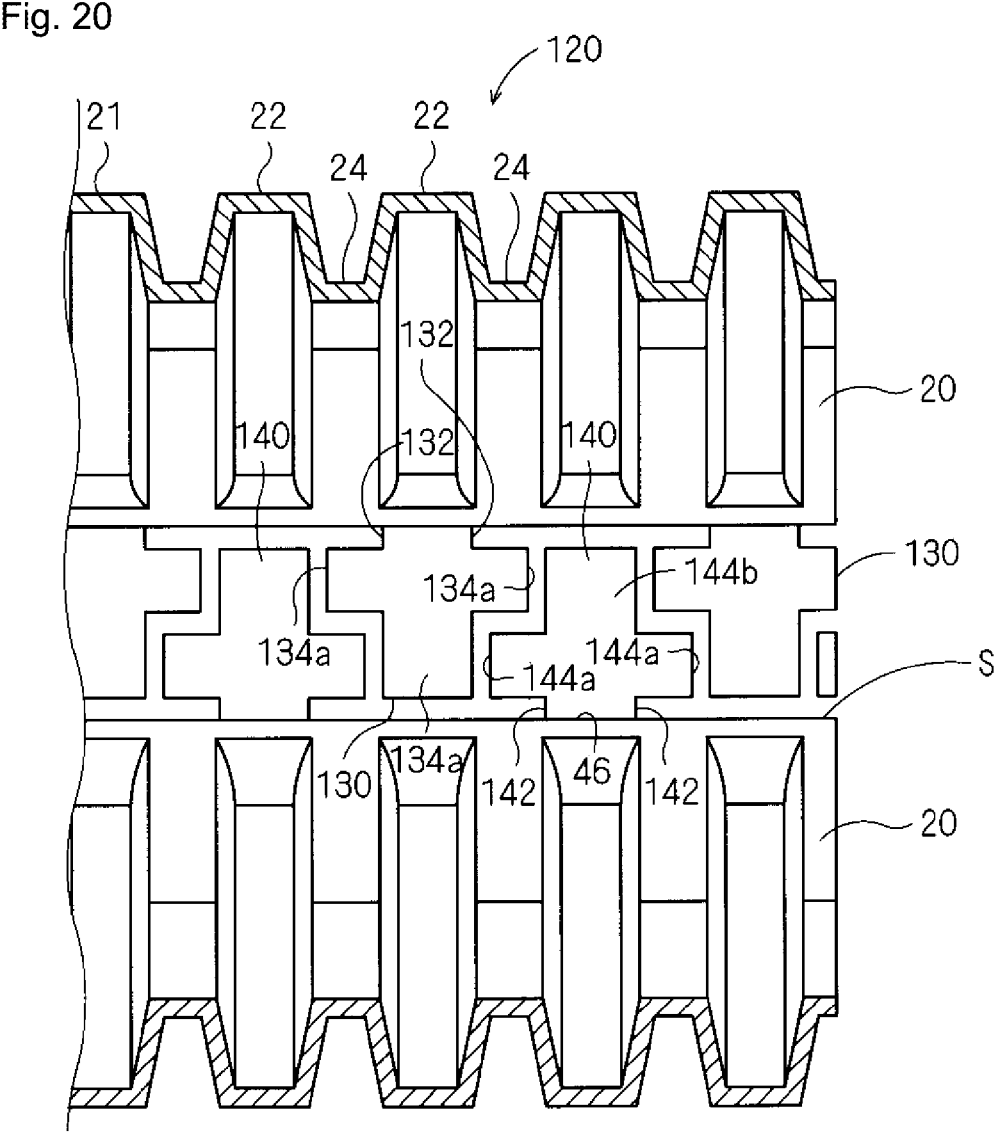
FIG. 20 is a partial explanatory diagram of the slit in the corrugated tube, as viewed from the inner peripheral side.

FIG. 13 is partial plan view of a wire harness 110 to which a corrugated tube 120 according to the modification is attached. FIG. 14 is a partial perspective view of the corrugated tube 120. FIG. 15 is a partial cross-sectional view of the corrugated tube 120. FIG. 16 is a partial explanatory diagram of the slit S in the corrugated tube 120, as viewed from an inner peripheral side. FIGS. 17 to 20 illustrate the corrugated tube 120 in a state prior to being closed at the slit S.

The corrugated tube 120 according to the modification differs from the corrugated tube 20 according to the above-described embodiment in the shape of the first extended tab 130 (corresponding to the first extended tab 30) and the shape of the second extended tab 140 (corresponding to the second extended tab 40).

Specifically, a first engagement notch 132 is formed on two lateral portions of a plurality of first extended tabs 130. Herein, the first extended tab 130 is formed in a plate shape, and on two lateral portions of a base end thereof is recessed in a linear shape toward a width-direction center portion of the first extended tab 130 to form the first engagement notch 132. More specifically, in a plan view of the first extended tab 130, the first engagement notch 132 is formed in a shape recessed in a rectangular shape, and one lateral edge of the first engagement notch 132 is positioned on the same straight line as an outer edge of one of two lateral edges having the slit S therebetween.

In addition, a second engagement notch 142 is formed on two lateral portions of the second extended tab 140. The second extended tab 140 and the second engagement notch 142 are formed to have the same shape as the first extended tab 130 and the first engagement notch 132, respectively.

In addition, in a state where the plurality of first extended tabs 130 and the plurality of second extended tabs 140 are fitted together as noted above, when a base end portion of the first extended tab 130 and a base end portion of the second extended tab 140 are provided at positions overlapping in the circumference direction of the corrugated tube main body 21, the mutually adjacent first engagement notch 132 and second engagement notch 142 engage with each other. Thereby, a state of engagement between the plurality of first extended tabs 130 and the plurality of second extended tabs 140 is maintained.

In addition, two corner portions toward the forefront end of the first extended tab 130 are formed in a notched "L" shape. Specifically, the portion on the first extended tab 130 further toward the forefront end than the pair of first engagement notches 132 includes a pair of lateral portions 134a having a rectangular shape projecting outward on two sides, and a forefront end portion 134b having a rectangular shape projecting toward the forefront end with a width narrower than the pair of lateral portions 134a, the portion toward the forefront end being formed in a "T" shape in a plan view.

Further, the second extended tab 140 also includes a pair of lateral portions 144a and a forefront end portion 144b, and is formed in the same shape as the first extended tab 130.

By forming the first extended tab 130 and the second extended tab 140 in the above-noted shape, the pair of lateral portions 134a of the first extended tab 130 can be positioned at a notched portion toward the forefront end of the second extended tab 140, while the pair of lateral portions 144a of the second extended tab 140 can be positioned at a notched portion toward the forefront end of the first extended tab 130. Accordingly, portions of the corrugated tube main body 21 having the slit S therebetween are cut in a line shape along a boundary between the first extended tab 130 and the second extended tab 140, thereby enabling the first extended tab 130 and the second extended tab 140 to be formed easily.

Moreover, a dimension A between troughs of two mutually opposing first engagement notches 132 formed on opposing portions of adjacent first extended tabs 130 is defined to be larger than the maximum width dimension B of the second extended tab 140 fitted therebetween (see FIG. 16). In addition, the step portions 36 and 46 are formed on the base end of the first extended tab 130 and the second extended tab 140, in a manner similar to the above-noted embodiment.

In the present modification, also, the forefront ends of the first extended tab 130 and the second extended tab 140 can be fitted together in a manner similar to the above-noted embodiment while pressing down the first extended tab 130 and the second extended tab 140.

In the above, the present invention is described in detail. However, the above description is, in all aspects, for exemplary purposes and the present invention is not limited by the description. Numerous modifications not given as examples are understood to be conceivable without departing from the scope of the present invention.

DESCRIPTION OF REFERENCE NUMERALS

10 Wire harness
20, 120 Corrugated tube
21 Corrugated tube main body
22 Annular projection
24 Annular depression
26 Depression
30, 130 First extended tab
32, 132 First engagement notch
34, 44 Guiding lateral portion
36, 46 Step portion
40, 140 Second extended tab
42, 142 Second engagement notch
S Slit

The invention claimed is:

1. A corrugated tube comprising:
a corrugated tube main body formed in a tubular shape, with annular projections and annular depressions alternatingly formed along a length direction thereof, and with a slit formed along the length direction thereof;
a plurality of first extended tabs provided at intervals on the corrugated tube main body on one of two lateral edges having the slit therebetween, the first extended tabs having a first engagement notch formed on two lateral portions; and
a plurality of second extended tabs provided at intervals on the other of the two lateral edges at positions between each of the plurality of first extended tabs, the second extended tabs having a second engagement notch formed on two lateral portions and configured to engage with the first engagement notch,
wherein a depression is formed on a portion of an inner periphery of the corrugated tube main body, the plurality of first extended tabs or the plurality of second extended tabs being positioned in the depression in a condition in which the plurality of first extended tabs and the plurality of second extended tabs are fitted together.

2. The corrugated tube according to claim 1, wherein at least one guiding lateral portion is formed on at least one of the plurality of first extended tabs and the plurality of second extended tabs, the guiding lateral portion advancing inward toward a forefront end of the first extended tabs and the second extended tabs.

3. The corrugated tube according to claim 1, wherein the plurality of first extended tabs are recessed toward the inner periphery of the corrugated tube main body via a step portion at positions where the first engagement notches are provided, and
the plurality of second extended tabs are recessed toward the inner periphery of the corrugated tube main body via a step portion at positions where the second engagement notches are provided.

4. The corrugated tube according to claim 1, wherein a dimension between troughs of two mutually opposing first engagement notches or second engagement notches is larger than a maximum width dimension of the second extended tab or the first extended tab fitted therebetween.

5. A wire harness with a corrugated tube comprising:
a wire harness having at least one electric wire; and
a corrugated tube according to claim 1, wherein the corrugated tube covers the wire harness in a condition in which the plurality of first extended tabs and the plurality of second extended tabs are fitted together.

\* \* \* \* \*